United States Patent
Ma et al.

(10) Patent No.: US 10,914,153 B2
(45) Date of Patent: Feb. 9, 2021

(54) SYSTEMS AND METHODS DERIVING HYDRAULIC FRACTURE GROWTH FROM MICROSEISMICITY ANALYSIS

(71) Applicant: Halliburton Energy Services, Inc., Houston, TX (US)

(72) Inventors: Jianfu Ma, Pearland, TX (US); Avi Lin, Houston, TX (US); Baidurja Ray, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 379 days.

(21) Appl. No.: 15/754,124

(22) PCT Filed: Oct. 6, 2015

(86) PCT No.: PCT/US2015/054270
§ 371 (c)(1),
(2) Date: Feb. 21, 2018

(87) PCT Pub. No.: WO2017/061993
PCT Pub. Date: Apr. 13, 2017

(65) Prior Publication Data
US 2018/0245442 A1    Aug. 30, 2018

(51) Int. Cl.
*G06G 7/48*   (2006.01)
*E21B 43/26*  (2006.01)
(Continued)

(52) U.S. Cl.
CPC .............. *E21B 43/26* (2013.01); *G01V 1/288* (2013.01); *G01V 1/30* (2013.01); *G01V 1/42* (2013.01);
(Continued)

(58) Field of Classification Search
None
See application file for complete search history.

(56) References Cited

U.S. PATENT DOCUMENTS 6,947,843 B2    9/2005  Fisher et al.
2005/0115711 A1*  6/2005  Williams .............. E21B 43/267
                                                    166/308.1
(Continued)

FOREIGN PATENT DOCUMENTS

WO    2017061993 A1    4/2017

OTHER PUBLICATIONS

McClure, Mark W. "Stimulation mechanism and the direction of propagation of microseismicity." Proceedings, Thirty-Ninth Workshop on Geothermal Reservoir Engineering Stanford University. 2014.*

(Continued)

*Primary Examiner* — Rehana Perveen
*Assistant Examiner* — Nithya J. Moll
(74) *Attorney, Agent, or Firm* — John W. Wustenberg; Parker Justiss, P.C.

(57) ABSTRACT

An illustrative monitoring system for a hydraulic fracturing operation includes: a data acquisition module collecting microseismic signals from a subterranean formation undergoing a hydraulic fracturing operation; a processing module implementing a monitoring method; and a visualization module that displays an estimate or prediction of fracture extent. The monitoring method implemented by the processing module includes: deriving microseismic event locations and times from the microseismic signals; fitting at least one fracture plane to the microseismic event locations; projecting each microseismic event location onto at least one fracture plane; determining a time-dependent distribution of the projected microseismic event locations; calculating one or more envelope parameters from the time-dependent distribution; and generating an estimate or prediction of fracture extent using the or more envelope parameters. The envelope parameters may include an exponent of a time- (Continued)

power law, and said generating may include re-fitting the fracture plane if the exponent isn't approximately one-half.

15 Claims, 4 Drawing Sheets

(51) Int. Cl.
   *G01V 1/28* (2006.01)
   *G01V 1/30* (2006.01)
   *G01V 1/42* (2006.01)

(52) U.S. Cl.
   CPC ............... *G01V 2210/1234* (2013.01); *G01V 2210/1299* (2013.01); *G01V 2210/646* (2013.01); *G01V 2210/65* (2013.01)

(56) References Cited

U.S. PATENT DOCUMENTS

| | | | |
|---|---|---|---|
| 2008/0000639 A1* | 1/2008 | Clark | E21B 43/12 166/281 |
| 2008/0004847 A1 | 1/2008 | Bradford | |
| 2010/0307755 A1 | 12/2010 | Xu et al. | |
| 2011/0120702 A1 | 5/2011 | Craig | |
| 2014/0098638 A1 | 4/2014 | Ma et al. | |
| 2014/0278316 A1* | 9/2014 | Dusterhoft | E21B 43/25 703/10 |

OTHER PUBLICATIONS

Yin, Chen, et al. "The effect of the calibrated velocity on the microseismic event location precision." 2013 SEG Annual Meeting. Society of Exploration Geophysicists, 2013.*

Warpinski, Norm R. "Understanding hydraulic fracture growth, effectiveness, and safety through microseismic monitoring." ISRM International Conference for Effective and Sustainable Hydraulic Fracturing. International Society for Rock Mechanics and Rock Engineering, 2013.*

Neunhöfer, H., and T. Meier. "Seismicity in the Vogtland/Western Bohemia earthquake region between 1962 and 1998." Studia geophysica et geodaetica 48.3 (2004): 539-562.*

Vermylen, John, and Mark D. Zoback. "Hydraulic fracturing, microseismic magnitudes, and stress evolution in the Barnett Shale, Texas, USA." SPE Hydraulic Fracturing Technology Conference. Society of Petroleum Engineers, 2011.*

* cited by examiner

SYSTEMS AND METHODS DERIVING HYDRAULIC FRACTURE GROWTH FROM MICROSEISMICITY ANALYSIS

CROSS-REFERENCE TO RELATED APPLICATION

This application is the National Stage of, and therefore claims the benefit of, International Application No. PCT/US2015/054270 filed on Oct. 6, 2015, entitled "SYSTEMS AND METHODS DERIVING HYDRAULIC FRACTURE GROWTH FROM MICROSEISMICITY ANALYSIS," which was published in English under International Publication Number WO 2017/061993 on Apr. 13, 2017. The above application is commonly assigned with this National Stage application and is incorporated herein by reference in its entirety.

BACKGROUND

Unconventional reservoirs often have a low-permeability rock matrix that impedes fluid flows, making it difficult to extract hydrocarbons (or other fluids of interest) at commercially-feasible rates and volumes. Fortunately, the effective permeability of the formation can be increased by hydraulic fracturing. When the rock matrix is exposed to a high-pressure, high-volume flow of a relatively incompressible fluid, the low permeability causes sharp gradients in the formation's stress field, forcing integrity failures at the relatively weakest points of the rock matrix. Such failures often occur as sudden "cracking" or fracturing of the matrix that momentarily reduces the stress gradient until it can be rebuilt by the intruding fluid flow. As the high-pressure flow continues, the fractures may propagate, for example, as an intermittent series of small cracks, each crack yielding a small seismic shock ("a microseismic event"). Other such shocks may also be produced as the fluid deforms and shifts blocks of matrix material.

Oilfield operators generally desire to provide a relatively even distribution of fractures throughout the reservoir while avoiding overlap in the fractures connecting to different wells or different production zones in a single well. (Such overlaps prevent operators from applying a pressure differential across the region between the overlapping fracture families, dramatically reducing the rate and efficiency at which fluid can be drained from that region. Conversely, an uneven distribution of fractures leaves regions of low permeability that similarly cannot be drained effectively.) Thus, operators seek to induce fracturing with carefully controlled fracture reach ("extent"). Inaccuracies in predicting and controlling fracture extent significantly impair the efficiency and rate at which fluids can be recovered from the formation.

BRIEF DESCRIPTION OF THE DRAWINGS

Accordingly, the drawings and the following description disclose systems and methods that derive hydraulic fracture growth from microseismicity analysis. The growth models when used as disclosed herein enable better monitoring of fracture extents and better fracture extent prediction for nearby fracturing operations. In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figure 1:
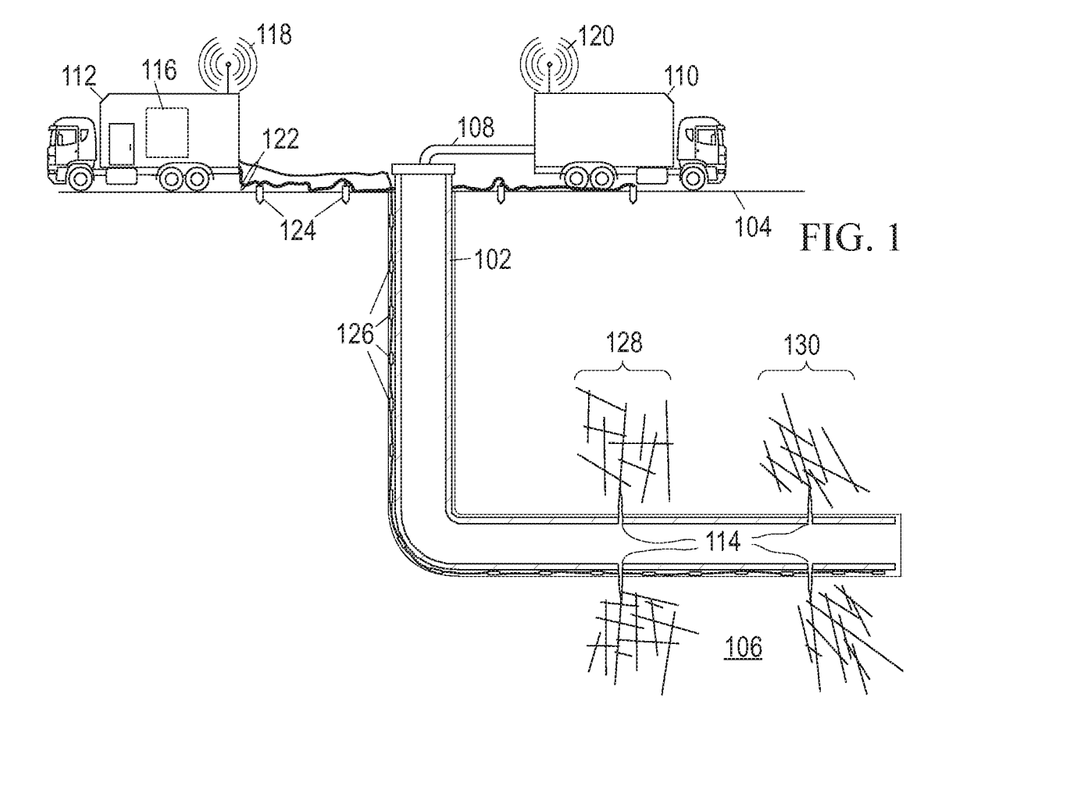
FIG. 1 is an environmental view of an illustrative hydraulic fracturing operation.

The disclosed hydraulic fracture modeling systems and methods are best understood in context. We begin here with a discussion of an illustrative hydraulic fracturing operation to which the disclosed systems and methods have been applied. FIG. 1 shows the environment of an illustrative hydraulic fracturing operation. A wellbore 102 extends from the surface 104 into a subterranean region 106. Typically, the subterranean region includes a reservoir that contains hydrocarbons or other resources such as, e.g., oil. As another example, the subterranean region 106 may include all or part of a rock formation (e.g., shale, coal, sandstone, granite, or others) that contains natural gas. The subterranean region 106 may include naturally fractured rock or natural rock formations that are not fractured to any significant degree. When the subterranean region 106 includes tight gas formations (i.e., natural gas trapped in low permeability rock such as shale), it is typically desirable to create additional fractures in the formation to increase the formation's effective permeability.

Accordingly, FIG. 1 also shows an injection assembly coupled to supply a high-pressure, high-volume fluid flow via a conduit 108 to the wellbore 102. The injection assembly includes one or more pump trucks 110 and instrument trucks 112 that operate to inject fluid via the conduit 108 and the wellbore 102 into the subterranean region 106, thereby opening existing fractures and creating new fractures. The fluid reaches the formation via one or more fluid injection locations 114, which in many cases are perforations in the casing of wellbore 102. Such casing may be cemented to the wall of the wellbore 102, though this is not a requirement. In some implementations, all or a portion of the wellbore 102 may be left open, without casing. The conduit 108 may include an injection manifold and feed pipe, as well as piping internal to the wellbore such as a work string, coiled tubing, sectioned pipe, or other types of conduit.

The fracture treatment may employ a single injection of fluid to one or more fluid injection locations 114, or it may employ multiple such injections, optionally with different fluids. Where multiple fluid injection locations 114 are employed, they can be stimulated concurrently or in stages. Moreover, they need not be located within the same wellbore 102, but may for example be distributed across multiple wells or multiple laterals within a well. An injection treatment control subsystem 116 coordinates operation of the injection assembly components (pump trucks, feed tanks, throttles, valves, flow sensors, pressure sensors, etc.) to monitor and control the fracture treatment. Though shown as being localized to a single instrument truck 112, the control subsystem 116 may in practice take the form of multiple data acquisition and processing subsystems optionally distributed throughout the injection assembly and wellbore 102, as well as remotely-coupled offsite computing facilities available via communication links and networks. Though the computing subsystem is described below as a separate entity for implementing hydraulic fracture modeling, some contemplated embodiments of the injection treatment control subsystem 116 have the simulator as an integrated component.

The pump trucks 110 can include mobile vehicles, immobile installations, skids, hoses, tubes, fluid tanks, fluid reservoirs, pumps, valves, mixers, or other types of structures and equipment. They supply treatment fluid and other materials (e.g., proppants, stop-loss materials) for the injection treatment. The illustrated pump trucks 110 communicate treatment fluids into the wellbore 102 at or near the level of the ground surface 104. The pump trucks 110 are coupled to valves and pump controls for starting, monitoring, stopping, increasing, decreasing or otherwise controlling pumping as well as controls for selecting or otherwise controlling fluids pumped during the injection treatment.

The instrument trucks 112 can include mobile vehicles, immobile installations, or other suitable structures and sensors for measuring temperatures, pressures, flow rates, and other treatment and production parameters. The example instrument trucks 112 shown in FIG. 1 include an injection treatment control subsystem 116 that controls or monitors the injection treatment applied by the injection assembly. The injection assembly may inject fluid into the formation above, at, or below a fracture initiation pressure; above, at, or below a fracture closure pressure; or at another fluid pressure.

Communication links 118, 120 enable the instrument trucks 112 to communicate with the pump trucks 110 and other equipment at the ground surface 104. Additional communication links 122 enable the instrument trucks 112 to communicate with sensors or data collection apparatus in the wellbore 102, other wellbores, remote facilities, and other devices and equipment. The communication links can include wired or wireless communications assemblies, or a combination thereof. FIG. 1 shows communication links 122 for an array of surface seismic sensors 124 and an array of downhole seismic sensors 126 for detecting and locating microseismic events. Though downhole sensors 126 are shown as being positioned in the injection well, they can also or alternatively be located in one or more nearby monitoring wells. Sensors 124 and/or 126 detect seismic energy from the microseismic events that occur as fractures are formed and propagated. The received energy signals from the sensors are processed by the control subsystem 116 to determine the microseismic event locations, times, and magnitudes. As discussed further below, such information is indicative of the fracture locations and dimensions, which information may be used to determine when the fracturing operations should be terminated and how to carry out subsequent operations to achieve the desired results.

The injection treatment control subsystem 116 may include data processing equipment, communication equipment, and other equipment for monitoring and controlling injection treatments applied to the subterranean region 106 through the wellbore 102. The injection treatment control subsystem 116 may be communicably linked to a remote computing facility that can calculate, select, or optimize treatment parameters for initiating, opening, and propagating fractures of the desired extent. The injection treatment control subsystem 116 may receive, generate or modify an injection treatment plan (e.g., a pumping schedule) that specifies properties of an injection treatment to be applied to the subterranean region 106. Based on such modeled behavior results, the injection treatment control subsystem 116 shown in FIG. 1 controls operation of the injection assembly.

FIG. 1 shows that an injection treatment has fractured the subterranean region 106, producing first and second fracture families 128, 130 from respective perforations 114. The induced fractures may extend through naturally fractured rock, regions of un-fractured rock, or both. The injected fracturing fluid can flow from the induced fractures into the natural fracture networks, into the rock matrix, or into other locations in the subterranean region 106 (e.g., faults, voids). The injected fracturing fluid can, in some instances, dilate or propagate the natural fractures or other pre-existing fractures in the rock formation. As discussed in the background section, the formation and propagation of fractures produces microseismic events, which may be identified and located based on analysis of the signals from sensors 124 and 126. Conventional processing techniques enable the location, time, and magnitude of each event to be determined.

Figure 2:
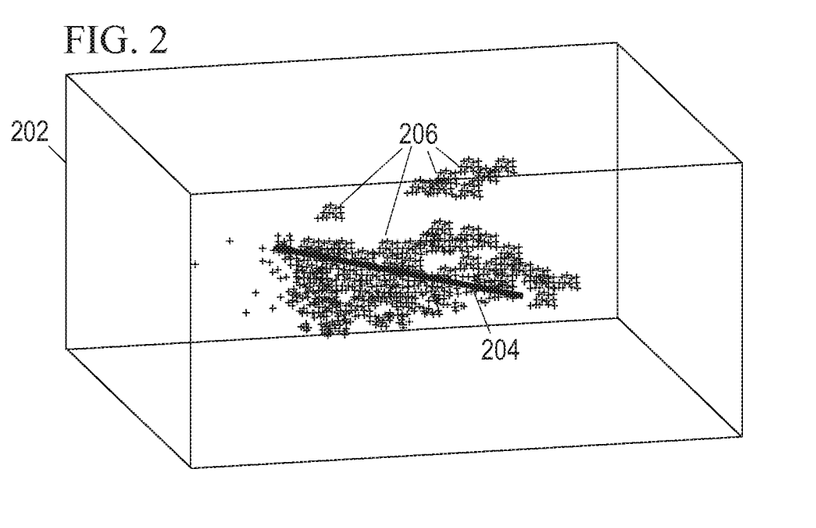
FIG. 2 is a map of an illustrative microseismic event distribution.

An illustrative microseismic event distribution is shown in FIG. 2. In the three dimensional model space 202, a solid line represents the wellbore trajectory 204. The location of each microseismic event is represented by a "+" symbol, revealing the spatial distribution of the microseismic events 206. Though it may not be apparent from FIG. 2, the microseismic events cluster along fracture planes and the edges of the clusters propagate outward from the wellbore, representing the locations of the fracture tips.

In some implementations, the control subsystem 116 collects and analyzes the signals from sensors 124, 126 to monitor fracture extents and to control the fluid injection parameters to bring the achieved fracture extent as close as possible to a target value. For example, the injection treatment control subsystem 116 can modify, update, or generate a fracture treatment plan (pumping rates, pressures, fluid compositions) based on the fracture extents derived from microseismic monitoring of the ongoing treatment, where it becomes imperative to employ highly adaptive computational algorithms that deliver high fidelity results with minimal consumption of computation resources, i.e., CPU time and memory requirements. As another example, fracture growth models derived from previous fracturing operations may provide predictions of fracture propagation rates and extents based on a proposed pumping schedule or other aspects of a formation treatment plan for subsequent operations in the field.

Some of the techniques and operations described herein may be implemented by a one or more computing assemblies configured to provide the functionality described. In various instances, a computing assembly may include any of various types of devices, including, but not limited to, handheld mobile devices, tablets, notebooks, laptops, desktop computers, workstations, mainframes, distributed computing networks, and virtual (cloud) computing systems.

Figure 3:
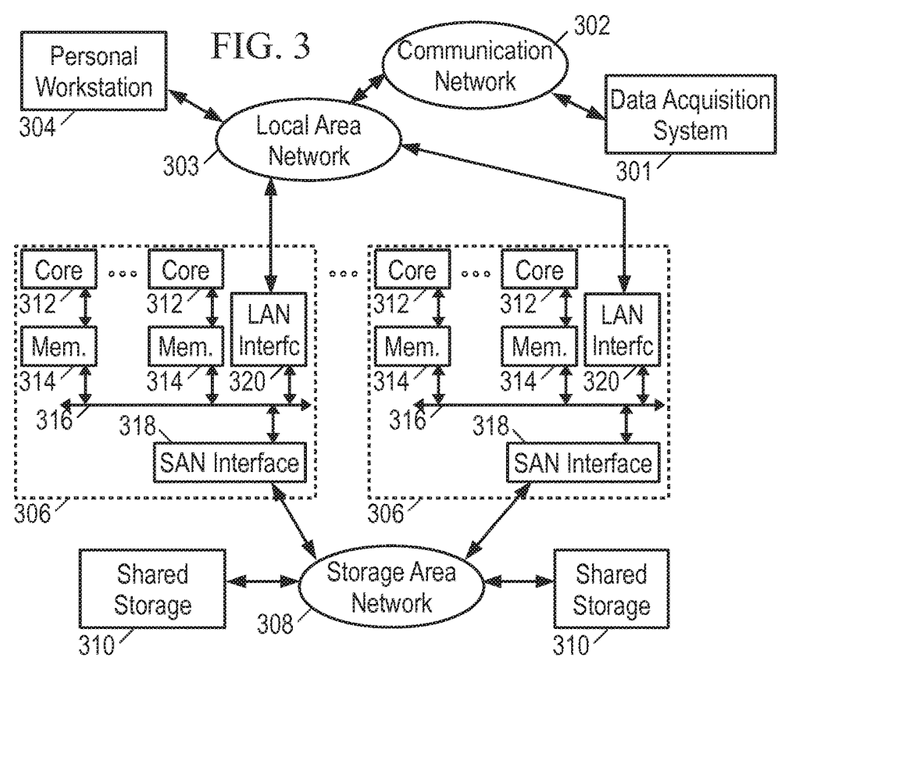
FIG. 3 is a block diagram of an illustrative hydraulic fracture modeling system.

FIG. 3 shows an illustrative computing subsystem 116 in which a data acquisition system 301 represents the instrument trucks 112 and other sources of data regarding the well and surrounding formations. A communications network 302 (such as, e.g., the internet or other communications link for transferring digital data) couples the data acquisition system 301 to a local area network (LAN) 303 to communicate the data to a personal workstation 304. The data can include treatment data, geological data, fracture data, fluid data, or other types of data. Workstation 304 may take the form of a desktop computer having a user interface (e.g., keyboard, mouse, and display) that enables the user to interact with the other elements of the computing subsystem, e.g., by entering commands and viewing responses. In this fashion, the user is able to retrieve the well data and make it available for simulation of flow in a network of fractures.

Workstation 304 may lack sufficient internal resources to perform such processing in a timely fashion. The LAN 303 further couples the workstation 304 to one or more multi-processor computers 306, which are in turn coupled via a storage area network (SAN) 308 to one or more shared storage units 310. LAN 303 provides high-speed communication between multi-processor computers 306 and with personal workstation 304. The LAN 303 may take the form of an Ethernet network.

Multi-processor computer(s) 306 provide parallel processing capability to enable suitably prompt processing of the microseismic and fracture growth modeling data. Each computer 306 includes multiple processors 312, distributed memory 314, an internal bus 316, a SAN interface 318, and a LAN interface 320. Each processor 312 operates on allocated tasks to solve a portion of the overall problem and contribute to at least a portion of the overall results. Associated with each processor 312 is a distributed memory module 314 that stores application software and a working data set for the processor's use. Internal bus 316 provides inter-processor communication and communication to the SAN or LAN networks via the corresponding interfaces 318, 320. Communication between processors in different computers 306 can be provided by LAN 304 or via a mailbox mechanism on storage devices 310.

SAN 308 provides low-latency access to shared storage devices 310. The SAN 308 may take the form of, e.g., a Fibrechannel or Infiniband network. Shared storage units 310 may be large, stand-alone information storage units that employ magnetic disk media for nonvolatile data storage. Other suitable forms of nontransitory information storage media can also be employed. To improve data access speed and reliability, the shared storage units 310 may be configured as a redundant disk array ("RAID").

It is the software that configures the various parts of the computing subsystem 116 to coordinate and collectively operate as a hydraulic fracture modeling system. One or more commercially available software packages and libraries may be installed in the computer assembly to provide the functionality for solving linear systems. User-authored programs, functions, scripts, workflows, or other programming mechanisms may be employed to customize the operation of the software and automate certain operations such as those outlined below for extracting microseismic events from sensor signals, fitting fracture planes to microseismic events, and formulating fracture growth models. The applications software may include a seismic signal processing module, a hydraulic fracture plane fitting module, an envelope fitting module, a fracture extent estimation module, a user interface module, and other function modules, each implemented in the form of machine-readable instructions. Examples of commercially available software that support the use of such programming include C, C++, C++ AMP, D, Erlang, and Fortran. The computing subsystem 110 can be preprogrammed or can be programmed (and reprogrammed) by loading a program from another source (e.g., from a CD-ROM, from another computer device through a data network, or in another manner). Nevertheless, the implementation of the following methods is not limited to any specific software language or execution environment.

Figure 4:
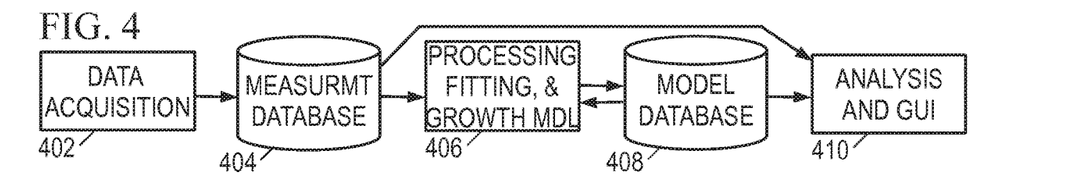
FIG. 4 is a diagram of an illustrative modeling software architecture.

The software operating on the computing subsystem 116 may be structured as indicated by the software architecture shown in FIG. 4. A data acquisition module 402 stores various types of data in a measurement database 404. The measurement database may include treatment data relating to injection treatment plans. For example the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

The measurement database may further include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

The measurement database may still further include fluid data relating to well fluids and entrained materials. The fluid data may identify types of fluids, fluid properties, thermodynamic conditions, and other information related to well assembly fluids. The fluid data can include flow models for compressible or incompressible fluid flow. For example, the fluid data can include coefficients for systems of governing equations (e.g., Navier-Stokes equations, advection-diffusion equations, continuity equations, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well assembly tools, or other fluids that may or may not be related to a well assembly.

The measurement database may yet still further include seismic sensor data and/or extracted microseismic event data. The seismic processing, fracture plane fitting, and fracture growth modeling modules 406 may employ the information from the measurement database 404 to locate and model the propagation of induced fractures. The fracture properties and propagation parameters are stored in model database 408. The fracture properties may include fracture planes calculated from microseismic data, with fracture strike angles, dip angles, and boundaries, possibly with additional parameters such as curvature, aperture, and growth models in each direction.

A visualization and analysis module 410 generates visual representations of the fracture planes and measurements for an operator, generally in an interactive form that enables the operator to enhance portions of the model and derive analytical results therefrom. The visual representation may depict spatial distributions of values and/or integrated values such as injected volumes, flow rates, fracture dimensions, and estimated permeabilities. In some contemplated embodiments, the analysis module further produces recommendations for real-time modifications to treatment plans that are underway.

Figure 5:
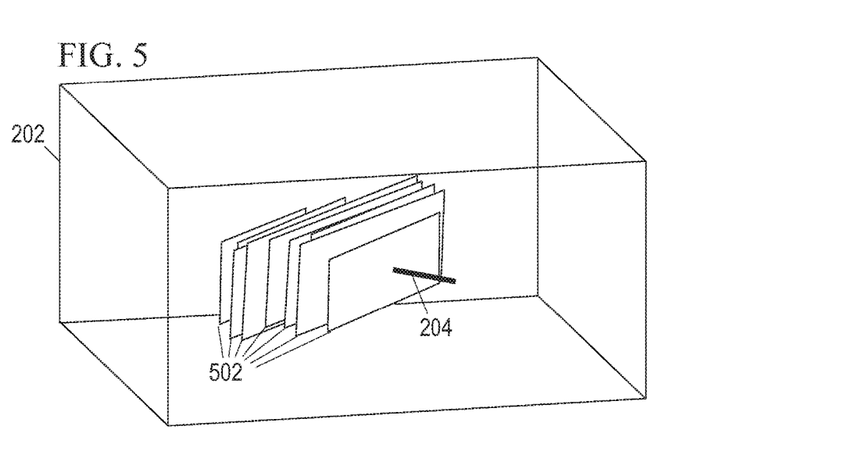
FIG. 5 is a map of illustrative hydraulic fracturing planes.

The computing subsystem analyzes the microseismic event distribution to extract the hydraulic fracture geometries using, e.g., optimal computational matching methodologies such as those set forth in Jianfu Ma and Ken Williams, "Systems and Methods for Hydraulic Fracture Characterization Using Microseismic Event Data", WIPO Pub. No: WO/2012/141720 A1; Jianfu Ma, Avi Lin and Harold Walters, "Analyzing Microseismic Data from a Fracture Treatment", WIPO Pub. No: WO/2014/055931 A1; and Jianfu Ma and Avi Lin, "Identifying Fracture Planes from Microseismic Data", US Pub. No: US 2014/0098638 A1. FIG. 5 shows a representative result, with nine principle fracture planes 502 with a general orientation normal to the wellbore 204. The temporal spatial distribution of these planes can be shown with the time evolution of microseismic events with which they are associated. Such description and visualization helps the field engineers to gain a deeper insight into the development of the hydraulic fractures and to correctly control the development of the fracture networks during the job, including the time and location of the hydraulic fracturing operation itself.

Figure 6:
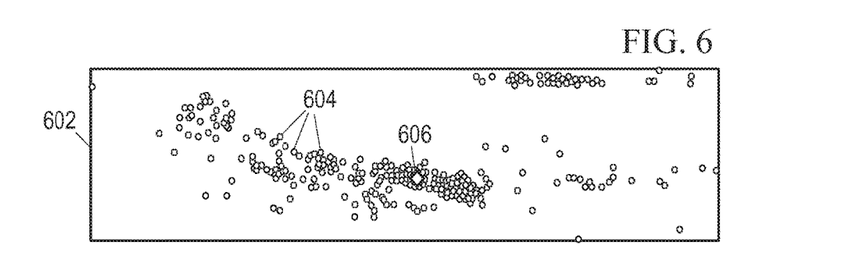
FIG. 6 is a map of microseismic events associated with a plane.

The largest (defined here as largest in extent, though other criteria can also be used, e.g., the largest number of associated microseismic events) of the fracture planes 502 is shown as plane 602 in FIG. 6, with the associated microseismic events 604 as projected points in the plane 602. This projection onto the plane is justifiable by assuming that the primary fluid flow occurs within the fracture plane, with the added benefit that it reduces the dimensionality of the problem and makes it easier to visualize the subsequent steps. (Strictly speaking, it may not be necessary, as each microseismic event has a readily ascertainable horizontal and vertical component even without being constrained to the fracture plane.) Also shown is the intersection 606 of the wellbore 204 with this plane. Some visualization embodiments show the time progression of the microseismic events by plotting them in the order in which they were detected.

Figure 7A:
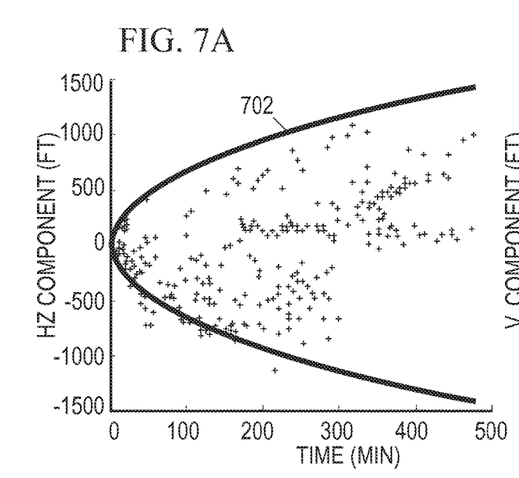
FIGS. 7A and 7B are graphs of microseismic event horizontal and vertical components versus time.
Figure 7B:
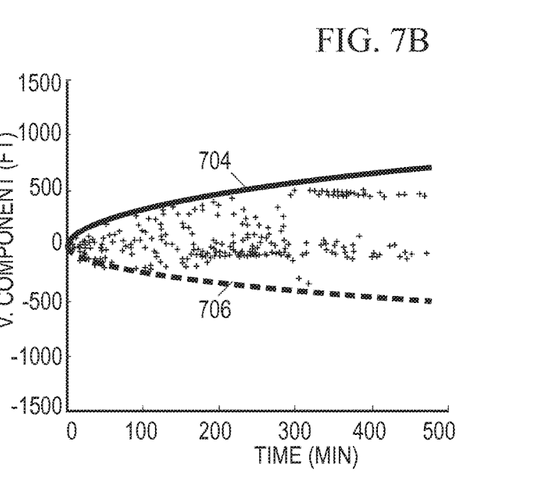

FIG. 7 shows an alternative view, with FIG. 7A showing the horizontal component of the microseismic events 604 in plane 602 (measured relative to the intersection 606) as a function of time and FIG. 7B showing the vertical component as a function of time. Envelopes 702-706 are discussed in detail below, but we note here that they demonstrate a square root of time dependence.

Such dependence is consistent with various fracture propagation models proposed for the petroleum industry, though none have previously been applied to propagation in the vertical dimension. One popular model is provided in Y. P. Zheltov and S. A. Khristianovich, 1955, *"Hydraulic Fracturing in an Oil-bearing Pool"*, Izv. AN SSR, OTN, No. 5; but here we focus on the PKN model of T. K. Perkins and L. F. Kern, 1961, "Widths of Hydraulic Fractures", J. Pet. Tech. 13: 937-949; and Nordgren, R. P. 1972, "Propagation of a Vertical Hydraulic Fracture", Soc. Pet. Eng. J. 12:306-314 (SEG 20102085). The PKN model with a simple leak-off term is preferred because its assumption related to the vertical plane's strain is physically more acceptable for height-contained fractures where the fracture length becomes considerably greater than the fracture height. The PKN model expresses the fracture half-length L as follows:

$$L(t) = \frac{q_i \bar{w}}{4\pi h C_L^2}\left(e^{\beta^2}\text{erfc}(\beta) + \frac{2\beta}{\sqrt{\pi}} - 1\right), \beta(t) = \frac{2C_L\sqrt{\pi t}}{\bar{w}}$$

where $q_i$ is the injection rate of treatment fluid into the fracture (unit, m³/s), $\bar{w}$ is the average fracture aperture (unit, m), h is the fracture height (unit, m), $C_L$ is the leak-off coefficient (unit, m/√s). It can be simplified with little loss of accuracy to:

$$L(t) = \frac{q_i t}{\bar{w}h + 2C_L h\sqrt{2t}}$$

The first term in the denominator describes the fluid accumulation within the fracture and the second term represents the fluid leak-off from the fracture into the neighboring formation's rock matrix, which most of the time is the filter cake. For relatively long time injection $$\left(t \gg \left(\frac{\bar{w}}{C_L}\right)^2\right),$$

the fluid leak-off term dominates the denominator and the fracture length evolves in proportion to the square-root-of-time:

$$L(t) \approx \frac{q_i}{2\sqrt{2}\,C_L h}\sqrt{t} \qquad (1)$$

Taking these models as a starting point, we now consider the spatio-temporal distribution of hydraulic-fracture-related microseismic events. FIG. 7A depicts the spatial and temporal distribution of horizontal components of the microseismic events from FIG. 6, which represent a two-wing fracture situation. The positive y-axis values represent the events from one wing of the fracture, while the negative values represent the events from the opposite fracture wing. The plot suggests that as long as the hydraulic fracturing process continues, the microseismic events on both sides of the fracture plane propagate transversely away from the wellbore. The events on the "front" or boundary are related to the tips of the fracture network at its horizontal extent (length tip). The rest of the events (internal events) may be associated with the tips of the fracture network at its vertical extent (height tip), with the leak-off mechanism, or with the interaction with pre-existing natural fractures.

Taking equation (1) as a model, the disclosed systems and methods characterize the propagation by assuming that the fracture length follows a time-power law, for example:

$$L(t) = \alpha_L t^{\beta_L}$$

The events selected to calibrate the above model's parameters for the current example, are those that are close to the "front" or boundary. (Various techniques may be employed for selecting the length tips, including, e.g., manual selection. Here, the outermost 10% of data points in each of four logarithmically-sized time windows were selected.) Applying the mathematical least-square method on this data yields:

$$\alpha_L = 50.505 \pm 3.087, \beta_L = 0.4985 \pm 0.0115$$

Note that the acceptable exponent range includes one-half:

$$\beta_L = 0.5 \in [0.487, 0.510]$$

Alpha is the fracture propagation coefficient. We show below that, when compared with dynamic behavior of fracture height, the fracture length propagates faster. The exponent beta confirms that the microseismic activity dynamics are linked to the long-time behavior of fracture length propagation. Envelope 702 is the curve $L = \alpha_L\sqrt{t}$. Visual inspection of FIG. 7A validates the square-root-of-time behavior of fracture length development, which is consistent with the PKN's model equation (1). Since the fracture length (2188 ft) is three and half times its height (622 ft), the PKN model assumptions are satisfied. This result provides strong support to the results of the optimal matching strategy.

FIG. 7B shows the spatial-temporal distribution of the vertical component of the microseismic events depicted in FIG. 6. The positive y-axis values represent the events for the upward growth of the fracture plane, while the negative values represent the events for the downward growth of the fracture plane. It is evident that as long as the hydraulic fracturing process continues, microseismic events grow away from perforation clusters in both upward and downward directions. In the present example, more events occur above the wellbore than below, probably due to the vertical stress distribution along the depth of the wellbore. The vertical growth model is accordingly split into the following two cases:

Upward Growth Model: Microseismic events on the upward "front" and beyond the boundary are related to the fracture height tip. The following time-power law is applied to the upward fracture growth:

$$H_{up}(t) = \alpha_h^{(1)} t^{\beta_h^{(1)}}$$

Selecting the outermost 5% of positive y-axis points and applying the mathematical least-square method yields:

$$\alpha_h^{(1)} = 21.0592 \pm 0.8144, \beta_h^{(1)} = 0.5060 \pm 0.0071$$

Again, the acceptable exponent range is observed to include one-half, and this is the exponent value used in plotting upper envelope 704.

Downward Growth Model: The time-power law can also be applied to the downward fracture growth:

$$H_{down}(t) = \alpha_h^{(2)} t^{\beta_h^{(2)}}$$

Microseismic events that are close to the downward "front" or boundary are selected to calibrate the above model parameters, and applying the mathematical least-square method yields:

$$\alpha_h^{(2)} = 16.451 \pm 4.265, \beta_h^{(2)} = 0.50621 \pm 0.007004$$

Again including one-half in the acceptable exponent range. Envelope 706 is plotted with this exponent value.

Accordingly, the fracture's vertical growth is observed to follow the square-root-of-time behavior as well, where the upward growth coefficient is larger than the downward growth coefficient probably due to the overburden stress increasing with depth. This is the first time such a model for fracture height is proposed in the petroleum industry, and it is believed to be a useful way to verify identified fracture planes as well as supporting and validating the fracture identification strategy.

Rory Dunphy and David Campagna ("Fractures, elastic moduli & stress: Geologic controls on hydraulic fracture geometry in the Horn River Basin", CSPG/CSEG/CWLS Geoconvention 2011) show that the regional in-situ principal stresses and the rock formation physically control hydraulic fracture patterns. Accordingly, the propagation coefficients should reveal the relationship between the vertical, minimum horizontal and maximum horizontal principal stress components. Moreover, microseismic events can now be classified based on their origin; the spatial-temporal correlation techniques distinguish the fracture's (length and height) tip related events from the fracture's leak-off associated events, enabling further analysis of internal events to characterize leak-off and flow-back mechanisms of hydraulic fractures and the complex interactions with the natural fractures. (Those events proximate to the envelopes may be classified as tip-related. More specifically, the events within, say, 10% of envelope 702 may be classified as length-tip events, while those events within 10% of envelopes 704 and 706 may be classified as height-tip events. These classifications need not be mutually exclusive.)

Tip related events occur due to the fracture propagation or fracture growth into the formation. The remaining events may be classified as leak-off-associated events. They occur due to either the leak-off of treatment fluid into rock matrix or the complex reactivation of pre-existing natural fractures. In the foregoing example, among the 294 microseismic events in FIG. 6, there are 118 tip-related events (40.1%) and 176 leak-off-associated events (59.9% of the total events).

Though the propagation coefficients $\alpha_L$ and $\alpha_h$ are dependent on the fluid pumping rate and leak-off coefficient (see equation (1)), the dynamic coefficients are further expected to depend on in-situ stress states and other formation parameters. Since the fracture propagates normal to the minimum horizontal principal stress and is usually parallel to the maximum horizontal principal stress, the injection pressure within the fracture must overcome the resistance of maximum horizontal principal stress to extend the fracture length. Hence, the length propagation coefficient $\alpha_L$ may be related to the maximum horizontal principal stress strength. Similarly, the coefficient $\alpha_h$ is associated with the vertical principal stress strength. In the preceding example, the ratio $$\frac{\alpha_L}{\alpha_h} \approx 2.4.$$

indicates that the vertical principal stress is much larger than the maximum horizontal principal stress.

Figure 8:
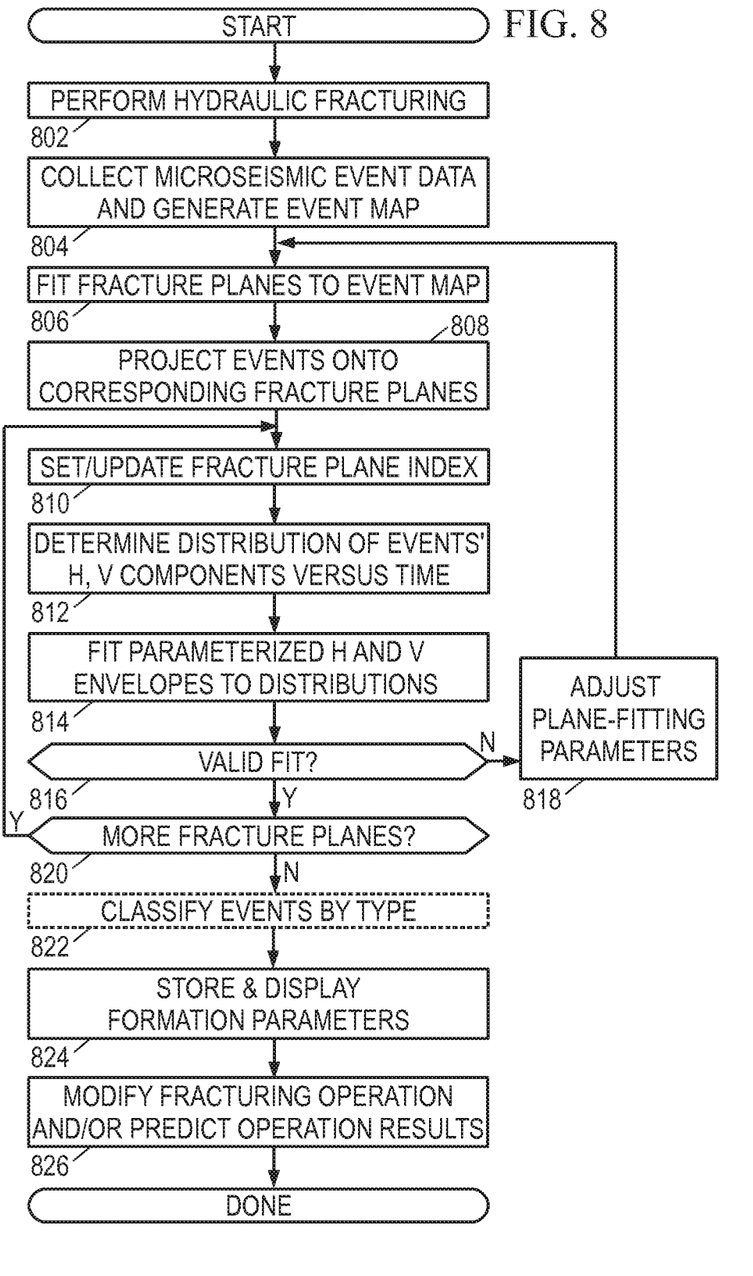
FIG. 8 is a flow diagram of an illustrative hydraulic fracture modeling method.

In view of the foregoing principles and techniques, FIG. 8 presents an illustrative hydraulic fracture modeling method that may be implemented in large part by the previously described computing subsystems. Though the operations of the method in FIG. 8 are shown and described as being sequential, in practice the operations are expected to occur concurrently and with potentially different orders.

The method begins in block 802 with a crew performing a hydraulic fracturing operation. Such operations normally occur in accordance with a predetermined pumping schedule that specifies a sequence of fluid compositions along with volumes, pumping rates, and injection pressures, though various parameters can be and are expected to be varied as circumstances require.

In block 804, the computing subsystems obtain microseismic signals and determine the location and time of each microseismic event. In block 806, the computing subsystems fit fracture planes to the mapped microseismic events, associating each microseismic event with at least one of the planes. In block 808, the microseismic events are projected onto their associated fracture planes, thereby determining a horizontal and vertical component for each event.

Blocks 810-820 form a loop that may iterate through each of the identified fracture planes in turn. In block 810, one of the fracture planes is selected. In block 812, the computing subsystem determines the distribution of horizontal components as a function of time and the distribution of vertical components as a function of time for the selected fracture plane. In block 814, the computing subsystem selects length-tip and height-tip related microseismic events and fits a parameterized time-power function to the selected events.

In block 816, the computing subsystem evaluates the parameter values of the fitted functions. If the parameters indicate an invalid propagation model (e.g., horizontal and vertical exponent values not approximately equal to one half), the fracture plane placement may be incorrect. Accordingly, the computing subsystem may adjust the parameters of the plane-fitting algorithm in block 818 and repeat the fracture plane fitting operation in block 806.

Otherwise, the computing subsystem accepts the fit as valid and in block 820 determines whether other fracture planes remain to be processed. If so, the loop 810-820 is repeated for the next fracture plane. Once all of the fracture planes have been analyzed, the computing subsystems may classify the microseismic events by type in block 822. For example, microseismic events within some range of the envelopes may be classified as tip events and the remaining events may be classified as leak-off events.

In block 824, the computing subsystem stores the fracture plane locations, the envelope parameters (including the exponent and the propagation coefficient in each direction), the optional event classifications, and any other extracted formation parameters (such as fracture extent). The subsystem may further display a visual representation of the extracted information for analysis by the field engineers.

In block 826, the computing subsystem predicts the fracture propagation rate and final fracture extent for ongoing fracturing operations and/or recommends modifying the pumping schedule to keep fracture extents within predefined limits. Employing the envelope as a prediction of fracture extent versus time enables a comparison of current and future fracture extents to predefined fracturing limits. In this fashion, the extracted propagation coefficients can be used to predict fracture extents and/or modify pumping schedules for future hydraulic fracturing operations in the same formation layer.

Thus, detailed analysis of the spatial and temporal distribution of microseismic events on hydraulic fractures associated with hydraulic fracturing stimulation is feasible. Such analysis shows that the fracture length development follows the square-root-of-the-time behavior, which is consistent with the popular PKN model. Moreover, the upward and downward growth of the fracture heights also follows the square-root-of-time dynamics. The propagation coefficient of the fracture height model is related to the overburden vertical stress while the coefficient of the fracture length model is associated with the maximum horizontal principal stress. The integrated analysis also distinguishes tip-related events from leak-off-associated events and reveals the importance of the leak-off mechanism and the complex interaction with pre-existing natural fractures.

In summary, the embodiments disclosed herein include:

A: A monitoring method for a hydraulic fracturing operation that comprises: collecting microseismic signals during the hydraulic fracturing operation; deriving microseismic event locations and times from the microseismic signals; fitting at least one fracture plane to the microseismic event locations; projecting each microseismic event location onto at least one fracture plane; determining a time-dependent distribution of the projected microseismic event locations; calculating one or more envelope parameters from the time-dependent distribution; generating an estimate or prediction of fracture extent using the one or more envelope parameters; and storing or displaying the estimate or prediction of fracture extent.

B: A hydraulic fracturing operation monitoring system that comprises: a data acquisition module collecting microseismic signals from a subterranean formation undergoing a hydraulic fracturing operation; a processing module implementing a monitoring method; and a visualization module that displays the estimate or prediction of fracture extent. The monitoring method implemented by the processing module includes: deriving microseismic event locations and times from the microseismic signals; fitting at least one fracture plane to the microseismic event locations; projecting each microseismic event location onto at least one fracture plane; determining a time-dependent distribution of the projected microseismic event locations; calculating one or more envelope parameters from the time-dependent distribution; and generating an estimate or prediction of fracture extent using the one or more envelope parameters.

Each of the embodiments A and B, may further include one or more of the following additional features in any combination: (1) the estimate or prediction is a prediction based on a pumping schedule, with the method further comprising comparing the prediction of fracture extent to a predetermined limit and modifying the pumping schedule to bring the prediction below the predetermined limit. (2) the method further comprises completing a hydraulic fracturing operation in accordance with the modified pumping schedule. (3) the one or more envelope parameters include an exponent of a time-power law. (4) the one or more envelope parameters further include a propagation coefficient. (5) said generating includes: re-fitting the at least one fracture plane and repeating the projecting, determining, and calculating operations if the exponent does not approximately equal one-half. (6) the time-dependent distribution is a distribution of horizontal components of the projected microseismic event locations. (7) the time-dependent distribution is a distribution of vertical components of the projected microseismic event locations. (8) the one or more envelope parameters include at least one parameter for an upward-propagation envelope and at least one parameter for a downward-propagation envelope. (9) the method further comprises finding additional envelope parameters for a time-dependent distribution of horizontal components of the projected microseismic event locations, the one or more envelope parameters and the additional envelope parameters defining vertical and horizontal propagation envelopes. (10) the method further comprises classifying microseismic events as tip-related if they are proximate to at least one of the envelopes in the time-dependent distributions. (11) the method further comprises classifying microseismic events as leak-off related if they are not classified as tip-related.

Numerous variations and modifications will become apparent to those skilled in the art once the above disclosure is fully appreciated. The ensuing claims are intended to cover such variations where applicable.

What is claimed is:

1. A monitoring method for a hydraulic fracturing operation comprises:

collecting microseismic signals during the hydraulic fracturing operation;

deriving microseismic event locations and times from the microseismic signals;

fitting at least one fracture plane to the microseismic event locations;

projecting each microseismic event location onto at least one fracture plane;

determining a time-dependent distribution of the projected microseismic event locations;

calculating one or more envelope parameters from the time-dependent distribution, wherein the one or more envelope parameters include an exponent of a time-power law;

generating an estimate or prediction of fracture extent using the one or more envelope parameters;

storing or displaying the estimate or prediction of fracture extent;

comparing the prediction of fracture extent to a predetermined extremal bounds;

modifying a pumping schedule to bring the prediction below the predetermined limit; and completing a hydraulic fracturing operation in accordance with the modified pumping schedule.

2. The method of claim 1, wherein the one or more envelope parameters further include a propagation coefficient.

3. The method of claim 1, wherein said generating includes:

if a range of the exponent does not include one-half, re-fitting the at least one fracture plane and repeating the projecting, determining, and calculating operations.

4. The method of claim 1, wherein the time-dependent distribution is a distribution of horizontal components of the projected microseismic event locations.

5. The method of claim 1, wherein the time-dependent distribution is a distribution of vertical components of the projected microseismic event locations.

6. The method of claim 5, wherein the one or more envelope parameters include at least one parameter for an upward-propagation envelope and at least one parameter for a downward-propagation envelope.

7. The method of claim 6, further comprising finding additional envelope parameters for a time-dependent distribution of horizontal components of the projected microseismic event locations, the one or more envelope parameters and the additional envelope parameters defining vertical and horizontal propagation envelopes.

8. The method of claim 7, further comprising classifying microseismic events as tip-related if they are proximate to at least one of the envelopes in the time-dependent distributions.

9. The method of claim 8, further comprising classifying microseismic events as leak-off related if they are not classified as tip-related.

10. A hydraulic fracturing operation monitoring system that comprises:

a data acquisition system collecting microseismic signals from a subterranean formation undergoing a hydraulic fracturing operation;

at least one multi-processor computer and non-transitory computer readable medium containing instructions for causing the at least one multi-processor computer to implement a monitoring method that includes:

deriving microseismic event locations and times from the microseismic signals;

fitting at least one fracture plane to the microseismic event locations;

projecting each microseismic event location onto at least one fracture plane;

determining a time-dependent distribution of the projected microseismic event locations;

calculating one or more envelope parameters from the time-dependent distribution, wherein the one or more envelope parameters include an exponent of a time-power law; and generating an estimate or prediction of fracture extent using the one or more envelope parameters; and a display that displays the estimate or prediction of fracture extent, wherein:

the prediction of fracture extent is compared to a predetermined limit;

modifying a pumping schedule to bring the prediction below the predetermined limit; and completing a hydraulic fracturing operation in accordance with the modified pumping schedule.

11. The system of claim 10, wherein said generating includes:

if a range of the exponent does not include one-half, re-fitting the at least one fracture plane and repeating the projecting, determining, and calculating operations.

12. The system of claim 10, wherein the time-dependent distribution is a distribution of horizontal components of the projected microseismic event locations.

13. The system of claim 10, wherein the time-dependent distribution is a distribution of vertical components of the projected microseismic event locations.

14. The system of claim 13, wherein the one or more envelope parameters include at least one parameter for an upward-propagation envelope and at least one parameter for a downward-propagation envelope.

15. The system of claim 14, wherein the method further comprises finding additional envelope parameters for a time-dependent distribution of horizontal components of the projected microseismic event locations, the one or more envelope parameters and the additional envelope parameters defining vertical and horizontal propagation envelopes, or the method further comprises classifying microseismic events as tip-related if they are proximate to at least one of the envelopes in the time-dependent distributions.

* * * * *

UNITED STATES PATENT AND TRADEMARK OFFICE
CERTIFICATE OF CORRECTION

| | |
|---|---|
| PATENT NO. | : 10,914,153 B2 |
| APPLICATION NO. | : 15/754124 |
| DATED | : February 9, 2021 |
| INVENTOR(S) | : Jianfu Ma, Avi Lin and Baidurja Ray |

It is certified that error appears in the above-identified patent and that said Letters Patent is hereby corrected as shown below:

On the Title Page

Item (57) IN THE ABSTRACT:
In the 16th Line, delete "extent using the or more envelope parameters." and insert --extent using the one or more envelope parameters.--

Signed and Sealed this
Thirteenth Day of September, 2022

Katherine Kelly Vidal
*Director of the United States Patent and Trademark Office*